United States Patent [19]
Leger

[11] Patent Number: 6,092,608
[45] Date of Patent: Jul. 25, 2000

[54] GARDEN TILLER PULVERIZING/EDGER ATTACHMENT

[76] Inventor: Herbert J. Leger, 715 St. Clair Rd., Breaux Bridge, La. 70517

[21] Appl. No.: 09/186,021

[22] Filed: Nov. 4, 1998

[51] Int. Cl.[7] .................................................. A01D 15/00
[52] U.S. Cl. ................................ 172/15; 172/17; 172/42; 172/48; 172/51; 30/DIG. 5
[58] Field of Search ........................... 172/13, 14, 15, 172/16, 17, 42, 41, 43, 44, 48, 51, 107, 245, 249, 252, 253, 254; 30/276, 277.4, 299, 307, DIG. 5

[56] References Cited

U.S. PATENT DOCUMENTS

| | | | |
|---|---|---|---|
| 2,088,534 | 7/1937 | Pittman | 172/16 |
| 2,464,695 | 3/1949 | Landrum | 172/17 |
| 3,141,507 | 7/1964 | Henry et al. | 172/15 |
| 3,907,039 | 9/1975 | Remley et al. | 172/15 |
| 4,002,205 | 1/1977 | Falk | 172/15 |
| 4,072,195 | 2/1978 | Carlson | 172/15 |
| 4,437,523 | 3/1984 | Isbell | 172/13 |
| 4,852,260 | 8/1989 | Federico et al. | 172/13 X |
| 5,065,567 | 11/1991 | Wessel et al. | 172/13 X |
| 5,842,331 | 12/1998 | Klee | 172/15 X |
| 5,924,494 | 7/1999 | Martinez | 172/13 |

*Primary Examiner*—Victor Batson
*Attorney, Agent, or Firm*—Robert N. Montgomery

[57] ABSTRACT

An attachment for a rotary garden tiller having edging capability for establishing perimeter of a flower bed alongside sidewalks, driveways, or fence lines which functions by cutting and separating grass from its roots at a uniform depth and width and in a controllable contoured line. The edger apparatus includes a cupped cultivation disc and a pulverizer wheel which includes chopping and digging capability. The cultivating disc shears vegetation and cultivates the soil in any contoured shape and maintains a fixed depth of three to four inches, requiring approximately one third of the time spent in edging required by other methods.

11 Claims, 6 Drawing Sheets

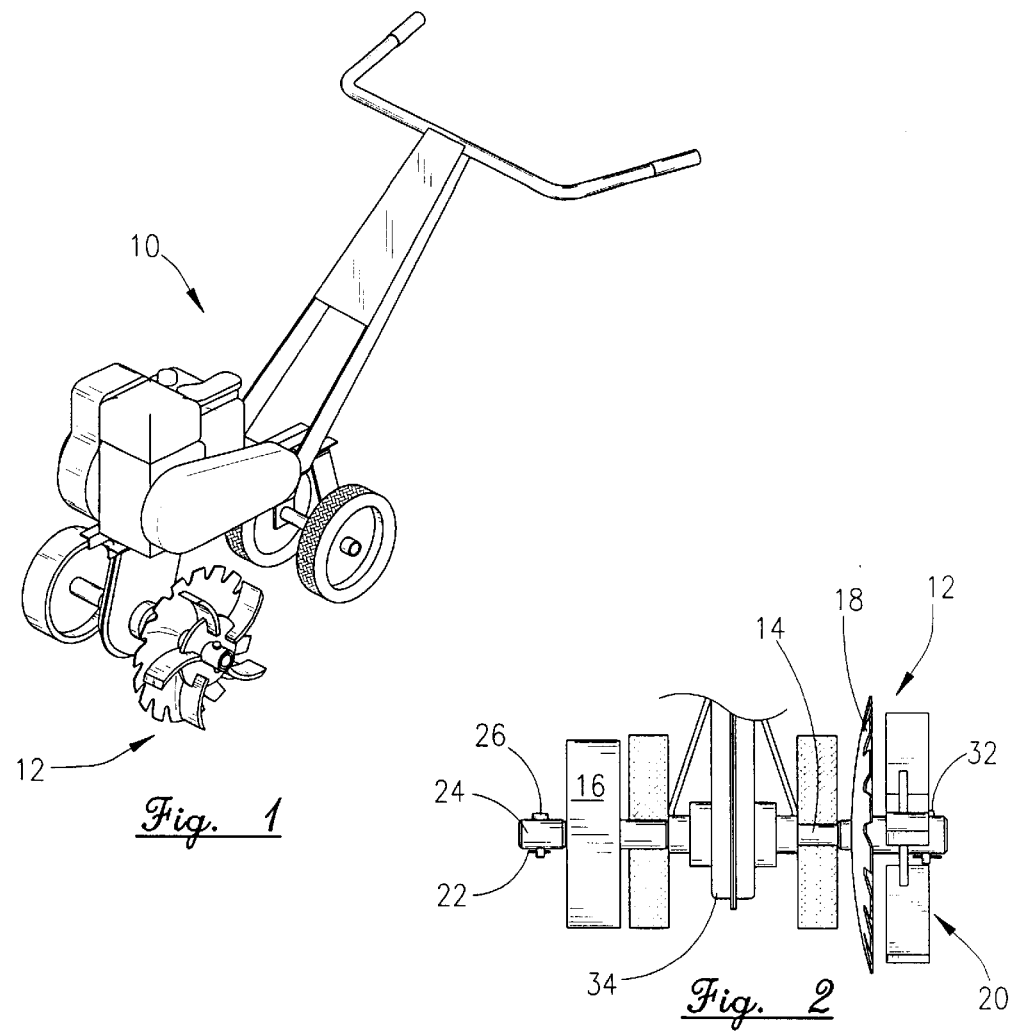
Fig. 1
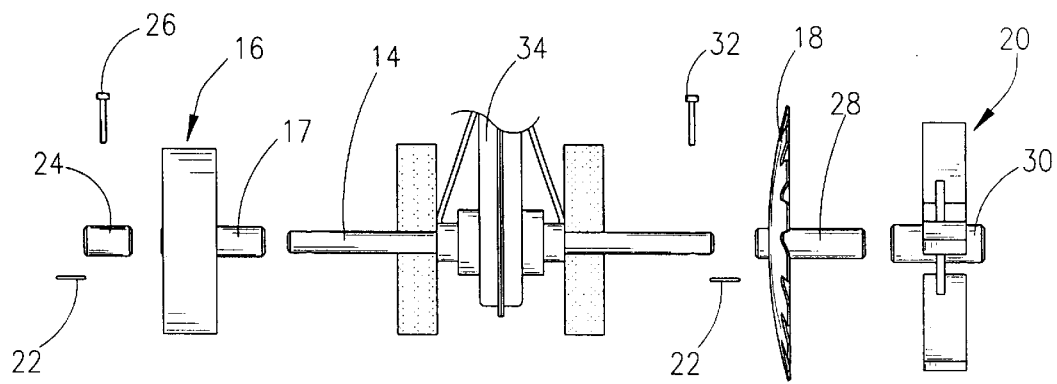
Fig. 2
Fig. 3

GARDEN TILLER PULVERIZING/EDGER ATTACHMENT

BACKGROUND OF THE INVENTION

1. Field of the Invention

This invention relates generally to Rotary garden tiller tines and more particularly to a pulverizer/edger tine assembly used for establishing and maintaining perimeter edges along flower beds, driveways, sidewalks, and fence lines etc.

2. General Background

Rotary garden tillers are generally configured with various types of tines for breaking, mulching, and otherwise tilling the soil in rows or beds. Such tillers are chiefly concerned with the cultivation of the soil within a given area with little or no concern with the location of the plot to be worked or the maintenance of the plot relative to adjacent or surrounding lands or obstacles, such as walks, driveways, fences, etc. Furthermore, many plots are surrounded by grass which will invade the tilled area when given a chance. It is therefore essential that a well defined perimeter be established and maintained around the tilled area. This is often done with landscape timbers, edge moldings and the like and maintained with a lawn edger, weed eater, etc. Such edging often presents as many problems as it solves and makes maintaining such barriers difficult at best.

It is therefore more advantageous to eliminate such barriers and provide a natural perimeter, no-grow zone around the tilled soil that can be easily maintained with the rotary tiller.

SUMMARY OF THE INVENTION

The instant invention overcomes the deficiencies described above by providing an attachment for a rotary garden tiller having edging capability. The tiller attachment described herein for establishing a perimeter of a flower bed alongside sidewalks, driveways, or fence lines functions by cutting and separating grass from its roots at a uniform depth and width and in a controllable contoured line. The apparatus separates the grass from the root of the grass plant, exposes the roots to sunlight, thus killing the root system, and deposits the cut grass inside the pulverized outer edge of the flower bed which rapidly decomposes into mulch. As a result, there is no need to rake, sweep or blow clippings since all cut vegetation is deposited in perimeter edge by the pulverizer/edger apparatus.

The edger apparatus includes a cupped cultivation disc and a pulverizer wheel, which includes chopping and digging capability. The cultivating disc shears vegetation and cultivates the soil in any straight line or contoured shape desired. The pulverizer/edger apparatus maintains a fixed depth of three to four inches by providing an adjustable wheel, also attached to the tiller. After first breaking the soil to a depth of three to four inches, the process need only be repeated approximately every six weeks or as often as the grass seeds sprout. Successive cuttings require approximately one third of the time spent in edging required by other methods.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 1 is an isometric view of a garden tiller with edging attachment;

FIG. 2 is a partial front elevation of the tiller and edger/pulverizer attachment illustrated in FIG. 1;

FIG. 3 is a partial exploded view of the edger/pulverizer attachment illustrated in FIG. 2;

DETAILED DESCRIPTION OF THE PREFERRED EMBODIMENT

Figure 10:
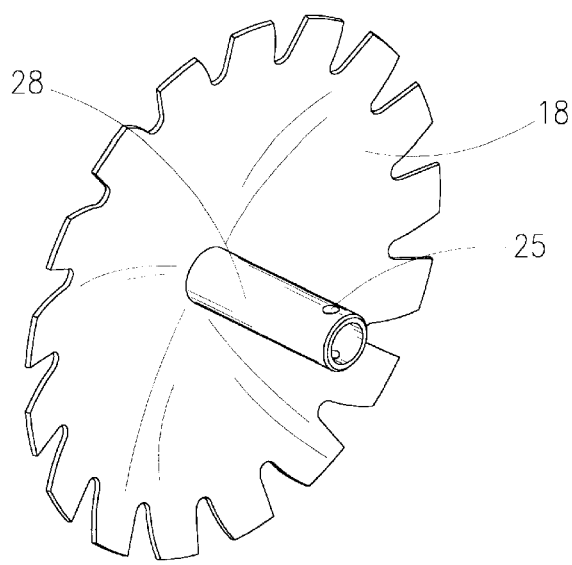
FIG. 10 is an isometric view of the edger disc.
Figure 11:
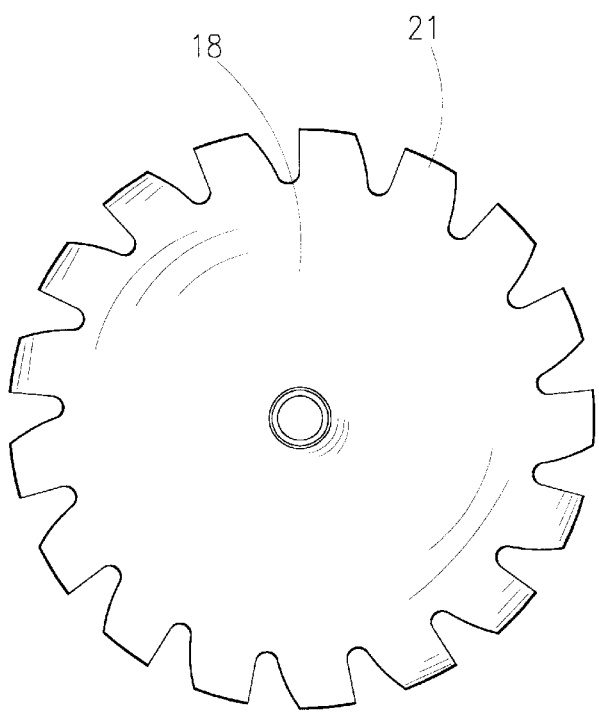
FIG. 11 is a side elevation view of the edger disc.
Figure 12:
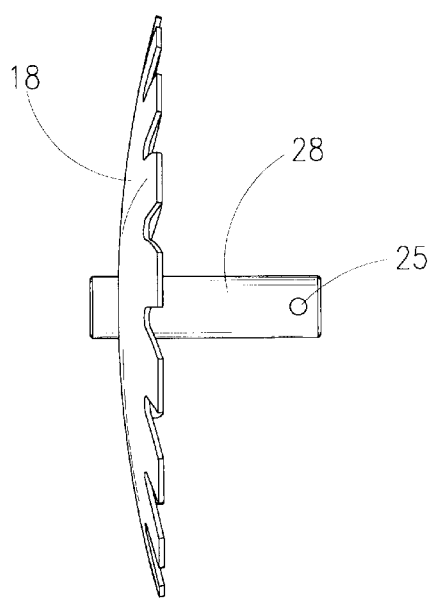
FIG. 12 is a front elevation view of the edger disc.
Figure 13:
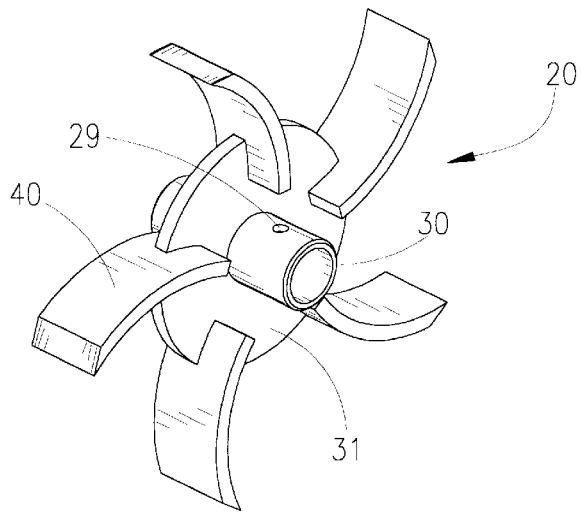
FIG. 13 is an isometric view of the chopper weldment.
Figure 14:
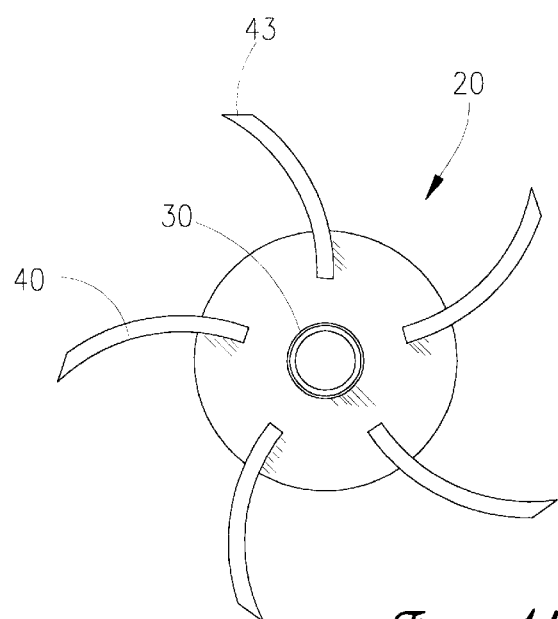
FIG. 14 is a side elevation view of the chopper weldment.
Figure 15:
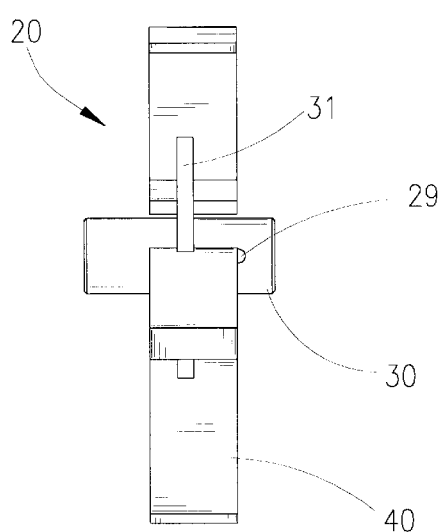
FIG. 15 is a front elevation view of the chopper weldment.
Figure 16:
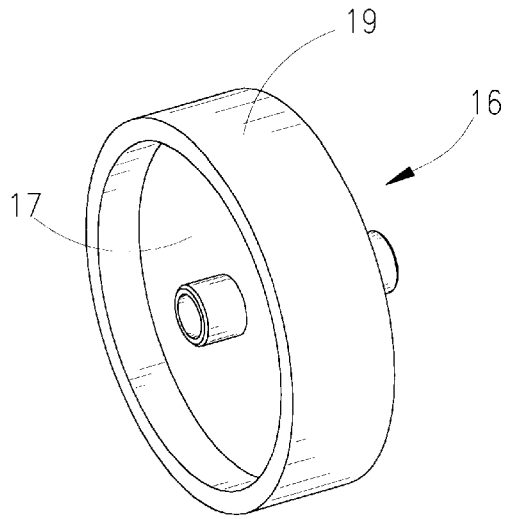
FIG. 16 is an isometric view of the wheel.
Figure 17:
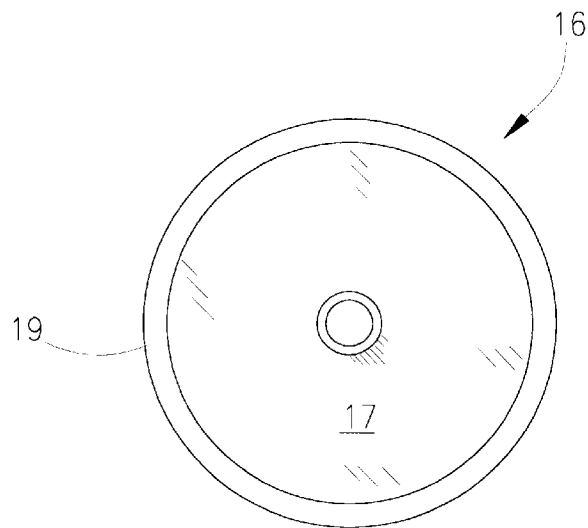
FIG. 17 is a side elevation view of the wheel.
Figure 18:
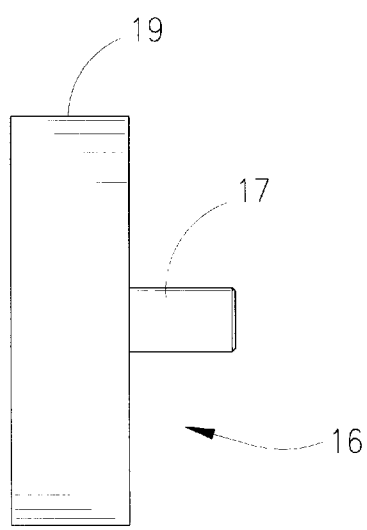
FIG. 18 is a front elevation view of the wheel.

The garden tiller 10 illustrated in FIG. 1 is fitted with an attachment assembly 12 including a wheel 16, a combination edger disc 18, and a pulverizer or chopping blade assembly 20 mounted on the tiller's rotatable shaft 14, better seen in FIG. 2. As seen in FIG. 3 the depth gauge wheel 16 is mounted to the tiller's rotatable shaft 14 and retained with a collar 24 and a transverse pin 26 passing through apertures in the collar 24 and the shaft 14 and retained with a cotter pin 22. It should be noted that the tubular sleeve axial housing 17 in the wheel 16, best seen in FIGS. 16–18, is offset to one side, as seen in FIG. 18, to provide proper spacing between the drive gear box 34 and the wheel 16 illustrated in FIG. 3. The wheel 16, as seen in FIG. 16, is a solid disk having a relatively wide flat rim 19 and a tubular sleeve 17 which is free to rotate about the tiller's rotatable shaft 14. The disc 18, best seen in FIGS. 10–12, is cupped or dished and is also secured to the tiller's rotatable shaft 14 at the shaft end opposite the wheel 16, as illustrated in FIG. 3, and secured to the shaft 14 with a transverse pin 26 passing through an aperture 25, seen in FIG. 12, in the tubular sleeve 28 and secured with a cotter pin 22, seen in FIG. 3. The tubular hub 28 is offset to the cupped or dished side of the disk 18. The pulverizer or chopping blade 20, more detailed in FIGS. 13–14, is integrated with the cupped disc 18 by telescopically joining their tubular hubs 28,30 and inserting a pin 32 as seen in FIG. 2, through both tubular hubs 28,30 by way of their apertures 25,29 and the tiller 10 rotatable shaft 14. It should be noted that, although the cupped disc and the chopper 20 work as a combination 12, the disc 18 may be used independently of the chopper or pulverizer implement 20. The chopper 20 is constructed as a disc 31 having a centrally located elongated tubular hub 30 passing therethrough and including a plurality of curved rectangular blades 40 attached perpendicular to the disk in a manner whereby the blades 40 emanating from the disc 31 curve in the same direction in a spiraling manner. The free ends of each blade 40 are sharpened diametrically so that each blade tip 43 as seen in FIG. 14 is equal to a particular radius from the rotating axis of the hub 30.

Figure 4:
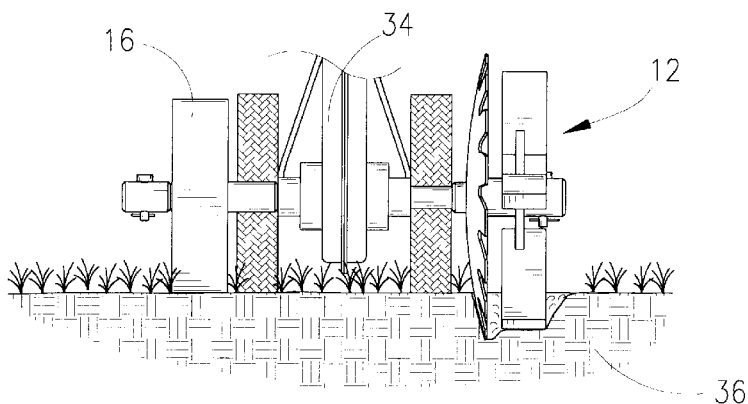
FIG. 4 is a front elevation view of the edging/pulverizer attachment illustrated in FIG. 2 as used in outlining a perimeter.

As discussed above, when a garden plot is first laid out, it is a good idea to first establish the perimeter. Such perimeter can be in any configuration desired. The perimeter should be a fairly deep and shape cut, insuring that all grass roots are severed, chopped and pulverized as seen in FIG. 4. The size of the wheel 16, which is located on the opposite side of the center gear box 34 of the tiller shaft 14, controls the depth the earth is pulverized usually, three to four inches deep. Generally a 10.5 inch diameter wheel will work the earth 36 three to four inches deep. An indentation or trench may be made by the tiller's rear wheels as it passes over or adjacent to the pulverized soil made by the edger/pulverizer attachment 12. There is no need for landscape timbers because indentation or edged pulverized earth in the outer worked area becomes the boundary line. It has been found that grass does not grow back or cross the defined perimeter as rapidly when the soil is deeply cut and all grass roots have been pulverized.

Figure 5:
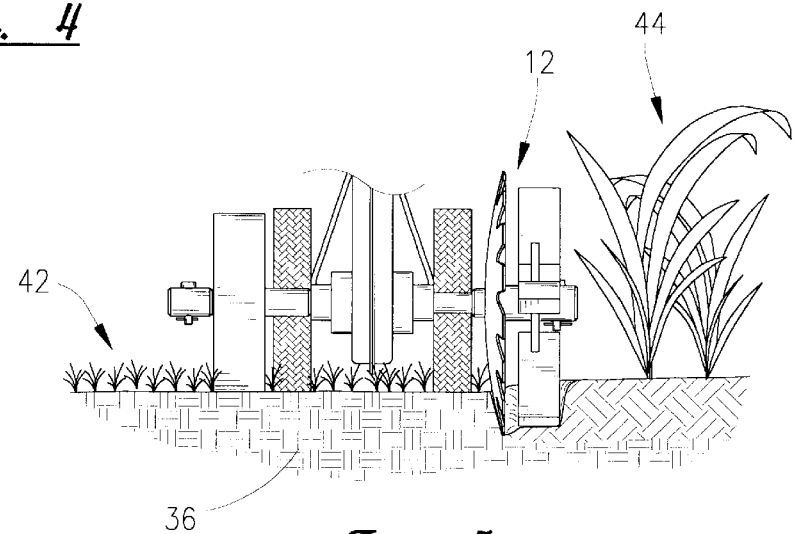
FIG. 5 is a front elevation view of the edger/pulverizer attachment illustrated in FIG. 4 as used in edging adjacent a garden.
Figure 6:
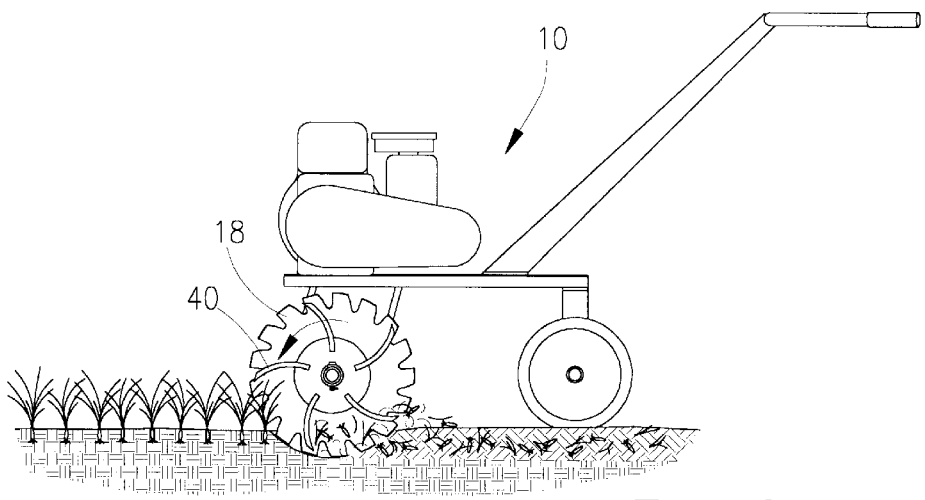
FIG. 6 is a side elevation view of the edger/pulverizer attachment illustrated in FIG. 1 in use below surface.

The pulverizer or chopper 20, as seen in FIG. 6, cleanly cuts and chops the roots of any grass adjacent the edger disc 18 for a depth of several inches. The curved rectangular blades of the chopper implement 20 are approximately 2 inches wide, have sharpened ends, and are of sufficient weight to insure good cutting and soil penetration. Therefore, clumps are broken up and thoroughly separated and repeatedly cut and mixed with the soil 36. The cupped disc 18 has directional forward leading teeth 21, as seen in FIG. 11, for increased pulling power, insuring a clean edge and separating the grass to be pulverized from the adjacent grass land 42, as seen in FIG. 5, from the garden 44.

The edger/pulverizer can be used to maintain the perimeter as seen in FIG. 5 without disturbing the garden.

Figure 7:
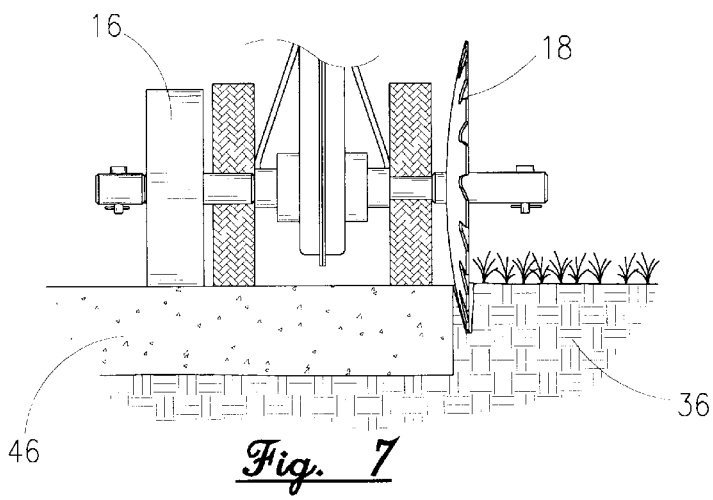
FIG. 7 is a partial front elevation view of the edger disc attachment only configuration as used to maintain a clear edge.

The tiller may also be used as an edger along driveways and sidewalks, as seen in FIG. 7 by utilizing the cupped disc 18 only. This insures a neat edge without making a beveled cut usually associated with weed eaters.

Figure 8:
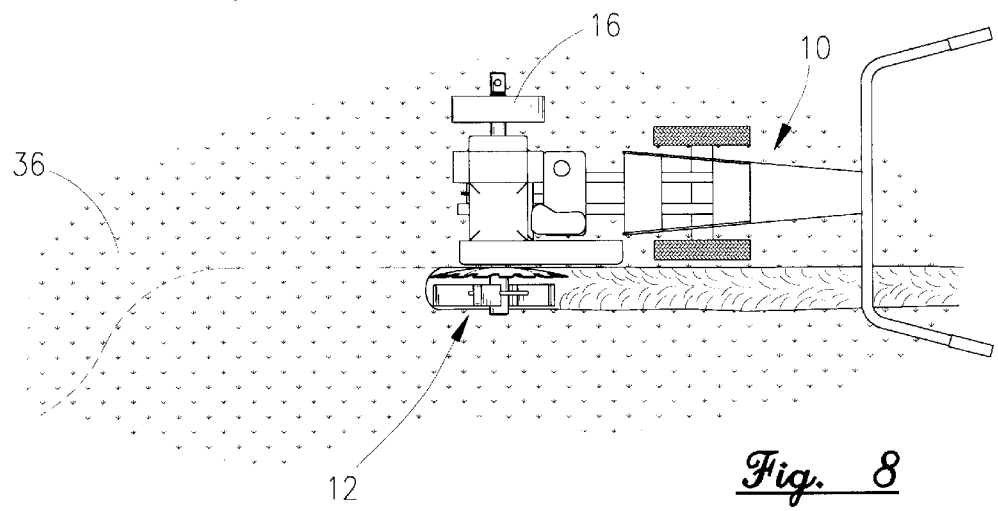
FIG. 8 is a top view of the tiller and edger/pulverizer illustrated in FIG. 1 in use.
Figure 9:
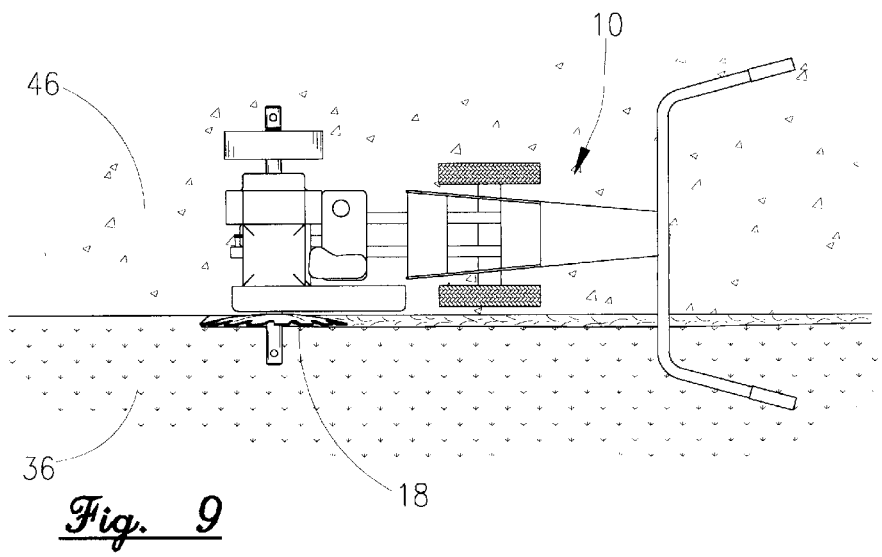
FIG. 9 is a top view of the tiller and edger disc only as illustrated in FIG. 7 in use.

As seen in FIG. 8, the edger/pulverizer combination attachment makes a clean border with sharp edge and tilled area about 4–6 inches wide and may be made in any contoured configuration, while the disc edger blade makes a much narrower cut with no tilled area along walkways.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An edging attachment for a rotary garden tiller comprising:
   a) a wheel having a tubular axial housing centrally attached therein and rotatably attached to one end of a rotatable tiller implement shaft;
   b) a cupped disc having directionally oriented teeth and a tubular sleeve centrally mounted therein, said tubular sleeve rotatably fixed upon said implement shaft adjacent an end opposite said wheel; and
   c) a chopping implement having a plurality of elongated rectangular curved blades having a sharpened end, said blades extending outwardly perpendicularly from a central disk having a tubular hub centrally mounted therein, said hub being telescopic with said sleeve in said cupped disc, said implement secured to said shaft in close proximity to said cupped disc.

2. The edging attachment according to claim 1 wherein said wheel is rotatable relative to said shaft.

3. The edging attachment according to claim 1 wherein said wheel is proportionally smaller than said cupped disc.

4. The edging attachment according to claim 1 wherein said cupped disc is attached to said shaft with a transverse pin passing through apertures in said tubular sleeve and said shaft.

5. The edging attachment according to claim 1 wherein said chopping implement is attached to said shaft with a transverse pin passing through apertures in said tubular hub, said tubular sleeve in said cupped disc and said shaft.

6. The edging attachment according to claim 1 wherein said tubular axial housing in said wheel is offset to one side of said wheel.

7. The edging attachment according to claim 1 wherein said tubular sleeve in said cupped disc is offset to the cupped side of said disc.

8. The edging attachment according to claim 1 wherein said wheel is retained to said shaft with a collar located outboard of said wheel and secured to said shaft with a transverse pin passing through apertures in said collar and said shaft.

9. A combination edger/pulverizer for attachment to a garden tiller having a rotatable shaft extending outwardly from a central drive unit, the attachment comprising:
   a) a pulverizer comprising:
      i) an elongated tubular hub having a longitudinal bore and a transverse bore extending through said hub;
      ii) a disk attached perpendicular to said sleeve; and
      iii) a plurality of rectangular curved blades having a sharp leading edge, said blades extending radially outward from said disk; and
   b) a cupped disc having directional orientated teeth, said disc having an elongated tubular sleeve telescopic with said elongated tubular hub of said pulverizer, centrally attached perpendicular to said disc and capable of being attached to one end of a tiller having a rotatable shaft;
   c) a wheel having a diameter proportionally greater than a diameter of said cupped disc and pulverizer adapted to be located rotatable upon said rotatable tiller shaft and adapted to be located at an end opposite said pulverizer; and
   d) means for fixedly attaching said cupped disc and pulverizer to said rotatable shaft in a manner whereby said pulverizer is located outboard of said cupped disc and in close proximity to said cupped disc.

10. A method of edging and pulverizing the soil along a perimeter of a garden plot comprising the steps of:
   a) providing and installing edging and chopping attachments on a garden tiller comprising:
      i) a wheel having a tubular axial housing centrally attached therein and rotatably attached to one end of a rotatable tiller implement shaft;
      ii) a cupped disc having directionally oriented teeth and a tubular sleeve centrally mounted therein, said sleeve rotatably fixed upon said implement shaft adjacent an end opposite said wheel; and iii) a chopping implement having a plurality of elongated rectangular curved blades having a sharpened end, said blades extending outwardly perpendicularly from a central disk having a tubular hub centrally mounted therein, said hub being telescopic with said tubular sleeve in said cupped disc, said chopping implement secured to said shaft in close proximity to said cupped disc; and b) locating said wheel on one end of said tiller's rotatable shaft;

c) locating said cupped disc and said chopping implement at an end of said rotating shaft opposite said wheel in a manner whereby said chopping implement is outboard of said disc; and d) tilling the soil of said perimeter adjacent said garden plot at a depth of 3–4 inches.

11. The method according to claim 10 further including the step of:

removing said chopping implement from said tiller and tilling the soil with said cupped disc adjacent a walk or driveway.

* * * * *